US012430864B2

(12) United States Patent
Song et al.

(10) Patent No.: US 12,430,864 B2
(45) Date of Patent: Sep. 30, 2025

(54) PROP ATTACHMENT METHOD AND APPARATUS, DEVICE, AND STORAGE MEDIUM

(71) Applicant: Beijing Zitiao Network Technology Co., Ltd., Beijing (CN)

(72) Inventors: Li Song, Beijing (CN); Ling Li, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 323 days.

(21) Appl. No.: 18/034,345

(22) PCT Filed: Sep. 2, 2021

(86) PCT No.: PCT/CN2021/116138
§ 371 (c)(1),
(2) Date: Apr. 27, 2023

(87) PCT Pub. No.: WO2022/088971
PCT Pub. Date: May 5, 2022

(65) Prior Publication Data
US 2023/0377297 A1   Nov. 23, 2023

(30) Foreign Application Priority Data
Oct. 30, 2020   (CN) .......................... 202011193129.0

(51) Int. Cl.
*G06T 19/20* (2011.01)
(52) U.S. Cl.
CPC ...... *G06T 19/20* (2013.01); *G06T 2219/2016* (2013.01); *G06T 2219/2021* (2013.01)

(58) Field of Classification Search
CPC ............ G06T 19/20; G06T 2219/2016; G06T 2219/2021; G06T 2219/2004; G06T 17/205; G06T 3/04
See application file for complete search history.

(56) References Cited

U.S. PATENT DOCUMENTS

| 6,153,286 A | 11/2000 | Pfaffelhuber et al. |
| 9,401,044 B1 * | 7/2016 | Kaufman ................ G06F 3/017 |

(Continued)

FOREIGN PATENT DOCUMENTS

| CN | 104881894 A | 9/2015 |
| CN | 106484511 A | 3/2017 |

(Continued)

OTHER PUBLICATIONS

International Search Report issued in International Patent Application No. PCT/CN2021/116138 on Nov. 26, 2021.

(Continued)

*Primary Examiner* — Ryan R Yang
(74) *Attorney, Agent, or Firm* — Astute IP Law Group

(57) ABSTRACT

A prop attachment method and apparatus, a device, and a storage medium are provided. The method comprises: obtaining mesh data of a target object mesh and mesh data of a basic object mesh; determining deformation of the target object mesh with respect to the basic object mesh on the basis of mesh data of the basic object mesh and mesh data of the target object mesh; on the basis of a triangle correspondence between a first prop mesh and the basic object mesh, the deformation information, and mesh data of the first prop mesh, controlling the first prop mesh to perform deformation transfer, to obtain mesh data of a second prop mesh; and on the basis of mesh data of the second prop mesh (Continued)

and mesh data of the target object mesh, displaying a target object attached with a second prop corresponding to the second prop mesh.

20 Claims, 3 Drawing Sheets

(56) References Cited

U.S. PATENT DOCUMENTS

| | | | |
|---|---|---|---|
| 10,121,279 B1* | 11/2018 | Sundaram | G06T 15/20 |
| 2009/0213131 A1* | 8/2009 | DeRose | G06T 17/20 |
| | | | 345/581 |
| 2013/0120457 A1 | 5/2013 | Popovic | |
| 2013/0346588 A1 | 12/2013 | Zhang et al. | |
| 2018/0012407 A1 | 1/2018 | Chuang et al. | |
| 2020/0020173 A1* | 1/2020 | Sharif | G06T 19/20 |
| 2020/0219317 A1* | 7/2020 | Brochu | G06T 17/205 |
| 2020/0312022 A1 | 10/2020 | Ma | |
| 2021/0327116 A1 | 10/2021 | Wei et al. | |

FOREIGN PATENT DOCUMENTS

| | | |
|---|---|---|
| CN | 108829893 A | 11/2018 |
| CN | 109360166 A | 2/2019 |
| CN | 109859322 A | 6/2019 |
| CN | 109948454 A | 6/2019 |
| CN | 110288716 A | 9/2019 |
| CN | 111325846 A | 6/2020 |
| CN | 111353071 A | 6/2020 |
| CN | 111383308 A | 7/2020 |
| CN | 111652791 A | 9/2020 |
| CN | 111754431 A | 10/2020 |
| CN | 111768476 A | 10/2020 |
| CN | 112199526 A | 1/2021 |
| CN | 112530016 A | 3/2021 |

OTHER PUBLICATIONS

International Search Report and Written Opinion for International Application No. PCT/CN2021/117199, mailed on Dec. 17, 2021, 14 pages.

* cited by examiner

PROP ATTACHMENT METHOD AND APPARATUS, DEVICE, AND STORAGE MEDIUM

The present disclosure is the national phase of International Patent Application No. PCT/CN2021/116138 entitled "PROP ATTACHMENT METHOD AND APPARATUS, DEVICE, AND STORAGE MEDIUM", filed on Sep. 2, 2021, which claims the priority to Chinese patent application No. 202011193129.0, titled "PROP ATTACHMENT METHOD, APPARATUS AND DEVICE, AND STORAGE MEDIUM", filed on Oct. 30, 2020 with the China National Intellectual Property Administration, both of which are hereby incorporated herein by reference in their entireties.

FIELD

The present disclosure relates to the technical field of data processing, and in particular to a prop attachment method, apparatus and device, and a storage medium.

BACKGROUND

Prop attachment refers to attaching a special effect prop to a target object, to form an effect that the special effect prop is joined to the target object such as a face of a user.

At present, the prop attachment may only be achieved by vertex tracking. Specifically, a vertex on the special effect prop is fixed to the target object, and a size of the special effect prop is scaled to be consistent with that of the target object, to realize the prop attachment.

However, such a prop attachment is implemented at a coarse granularity and has poor performance in jointing the special effect prop to the target object.

SUMMARY

In order to solve the above technical problems or at least partially solve the above technical problems, a prop attachment method, apparatus and device, and a storage medium are provided according to the present disclosure, to realize prop attachment at fine granularity and improve effect of prop attachment.

In a first aspect, a prop attachment method is provided according to the present disclosure. The method includes:
  acquiring mesh data of a target object mesh and mesh data of a basic object mesh;
  determining deformation of the target object mesh relative to the basic object mesh based on the mesh data of the basic object mesh and the mesh data of the target object mesh;
  performing deformation transfer on a first prop mesh based on a triangulated surface correspondence between the first prop mesh and the basic object mesh, information about the deformation and mesh data of the first prop mesh to obtain mesh data of a second prop mesh, where the first prop mesh is attached to the basic object mesh; and
  displaying, based on the mesh data of the second prop mesh and the mesh data of the target object mesh, a target object on which a second prop corresponding to the second prop mesh is attached, where the target object corresponds to the target object mesh.

In an optional embodiment, before the performing deformation transfer on a first prop mesh relative to the target object mesh based on a triangulated surface correspondence between the first prop mesh and the basic object mesh, information about the deformation and mesh data of the first prop mesh, the method further includes:
  deforming an initial prop mesh relative to the basic object mesh to obtain the mesh data of the first prop mesh; and
  determining the triangulated surface correspondence between the first prop mesh and the basic object mesh based on a principle of minimum energy, the mesh data of the first prop mesh and the mesh data of the basic object mesh.

In an optional embodiment, the deforming an initial prop mesh relative to the basic object mesh to obtain the mesh data of the first prop mesh includes:
  fixing at least two designated points on the initial prop mesh to the basic object mesh, to be taken as deformation anchor points of the initial prop mesh, where the deformation anchor points are configured for being fixed on the initial prop mesh in a deformation process of the initial prop mesh; and
  deforming the initial prop mesh relative to the basic object mesh based on the principle of minimum energy, and determining the mesh data of the first prop mesh based on the mesh data of the basic object mesh and mesh data of the deformed initial prop mesh, where an initial prop corresponding to the initial prop mesh deforms into a first prop corresponding to the first prop mesh.

In an optional embodiment, the deforming the initial prop mesh relative to the basic object mesh based on the principle of minimum energy, and determining the mesh data of the first prop mesh based on the mesh data of the basic object mesh and mesh data of the deformed initial prop mesh includes:
  determining the initial prop mesh as a target prop mesh;
  determining a rotation matrix corresponding to a vertex of a triangulated surface on the target prop mesh based on the principle of minimum energy, mesh data of the target prop mesh and the mesh data of the basic object mesh;
  processing the mesh data of the target prop mesh with the rotation matrix according to the principle of minimum energy, to obtain mesh data of a deformed prop mesh; and
  in case of determining that a preset iteration condition is not met currently, updating the target prop mesh based on the deformed prop mesh, and performing the step of determining a rotation matrix corresponding to a vertex of a triangulated surface on the target prop mesh based on the principle of minimum energy, mesh data of the target prop mesh and the mesh data of the basic object mesh, until it is determined that the preset iteration condition is met currently, then determining mesh data of the deformed prop mesh as the mesh data of the first prop mesh.

In an optional embodiment, the first prop mesh includes multiple components, and the performing deformation transfer on a first prop mesh based on a triangulated surface correspondence between the first prop mesh and the basic object mesh, and information about the deformation to obtain mesh data of a second prop mesh includes:
  performing the deformation transfer on the first prop mesh based on the triangulated surface correspondence between the first prop mesh and the basic object mesh, information about the deformation and a relative relationship between adjacent components among the multiple components to obtain the mesh data of the second prop mesh.

In an optional embodiment, the performing deformation transfer on a first prop mesh based on a triangulated surface correspondence between the first prop mesh and the basic object mesh, information about the deformation and mesh data of the first prop mesh to obtain mesh data of a second prop mesh includes:

performing the deformation transfer on the first prop mesh according to the principle of minimum energy, based on the triangulated surface correspondence between the first prop mesh and the basic object mesh, information about the deformation and the mesh data of the first prop mesh, to obtain the mesh data of the second prop mesh.

In a second aspect, a prop attachment apparatus is provided according to the present disclosure. The apparatus includes an acquisition module, a first determination module, a first control module and a display module.

The acquisition module is configured to acquire mesh data of a target object mesh and mesh data of a basic object mesh.

The first determination module is configured to determine deformation of the target object mesh relative to the basic object mesh based on the mesh data of the basic object mesh and the mesh data of the target object mesh.

The first control module is configured to perform deformation transfer on a first prop mesh based on a triangulated surface correspondence between the first prop mesh and the basic object mesh, information about the deformation and mesh data of the first prop mesh to obtain mesh data of a second prop mesh, where the first prop mesh is attached to the basic object mesh.

The display module is configured to display, based on the mesh data of the second prop mesh and the mesh data of the target object mesh, a target object on which a second prop corresponding to the second prop mesh is attached, where the target object corresponds to the target object mesh.

In an optional embodiment, the apparatus further includes a second control module and a second determination module.

The second control module is configured to deform an initial prop mesh relative to the basic object mesh to obtain the mesh data of the first prop mesh.

The second determination module is configured to determine the triangulated surface correspondence between the first prop mesh and the basic object mesh based on a principle of minimum energy, the mesh data of the first prop mesh and the mesh data of the basic object mesh.

In a third aspect, a computer readable storage medium storing with instructions is provided according to the present disclosure. The instructions, when being executed on a terminal device, cause the terminal device to implement the above method.

In a fourth aspect, a device is provided according to the present disclosure. The device includes a memory, a processor, and a computer program stored in the memory and executable on the processor, where the processor executes the computer program to implement the above method.

Compared with the conventional art, the technical solutions provided according to the embodiments of the present disclosure have the following advantages.

According to an embodiment of the present disclosure, a prop attachment method is provided. First, mesh data of a target object mesh and mesh data of a basic object mesh are acquired. Then, deformation of the target object mesh relative to the basic object mesh is determined based on the mesh data of the basic object mesh and the mesh data of the target object mesh. Next, deformation transfer is performed on a first prop mesh based on a triangulated surface correspondence between the first prop mesh and the basic object mesh, information about the deformation and mesh data of the first prop mesh, to obtain mesh data of a second prop mesh, where the first prop mesh is attached to the basic object mesh. Finally, a target object, on which a second prop corresponding to the second prop mesh is attached, is displayed based on the mesh data of the second prop mesh and the mesh data of the target object mesh.

According to an embodiment of the present disclosure, by performing deformation transfer on a first prop mesh based on determined information about the deformation of the target object mesh relative to a basic object mesh, a triangulated surface correspondence between the first prop mesh and the basic object mesh, and mesh data of the first prop mesh attached to the basic object mesh, a second prop mesh attached to a target object mesh may be obtained, thus realizing prop attachment at fine granularity and improving prop attachment effect.

BRIEF DESCRIPTION OF THE DRAWINGS

The drawings herein are incorporated into the specification and constitute a part of the specification. The drawings show embodiments of the present disclosure. The drawings and the specification are used to explain the principle of the present disclosure.

In order to more clearly explain the embodiments of the present disclosure or the technical solutions in the conventional art, the drawings used in the description of the embodiments or the conventional art are briefly introduced below. Apparently, for those skilled in the art, other drawings can be obtained according to the provided drawings without any creative effort.

DETAILED DESCRIPTION OF EMBODIMENTS

In order to understand the above objects, features and advantages of the present disclosure more clearly, the solutions of the present disclosure are further described hereinafter. It should be noted that the embodiments of the present disclosure and the features in the embodiments can be combined with each other if there is no conflict.

In the following description, numerous specific details are set forth in order to provide thorough understanding of the present disclosure. However, the present disclosure may also be implemented in other ways different from those described here. Obviously, the embodiments in the specification are only a part of the embodiments of the present disclosure, rather than all the embodiments.

In order to realize prop attachment at fine granularity and optimize prop attachment effect, a prop attachment method is provided according to the present disclosure. In an embodiment, deformation of a target object mesh relative to a basic object mesh, a triangulated surface correspondence between a first prop mesh and the basic object mesh, and triangulated surface data of the first prop mesh attached to the basic object mesh are determined. Then, deformation transfer is performed on the first prop mesh based on information about the deformation, the triangulated surface correspondence and the triangulated surface data of the first prop mesh, to obtain mesh data of a second prop mesh. Finally, a target object attached with a second prop is displayed based on the mesh data of the second prop mesh and mesh data of the target object mesh. The function of prop attachment is realized.

According to an embodiment of the present disclosure, first, a first prop mesh attached to a basic object mesh is determined. Then, deformation transfer is performed on the first prop mesh based on a relationship between the first prop mesh and the basic object mesh and a relationship between the basic object mesh and a target object mesh, to obtain a second prop mesh attached to the target object mesh. As seen, according to the embodiment of the present disclosure, prop attachment at finer granularity is realized and prop attachment effect is improved by performing deformation transfer on the prop mesh.

Figure 1:
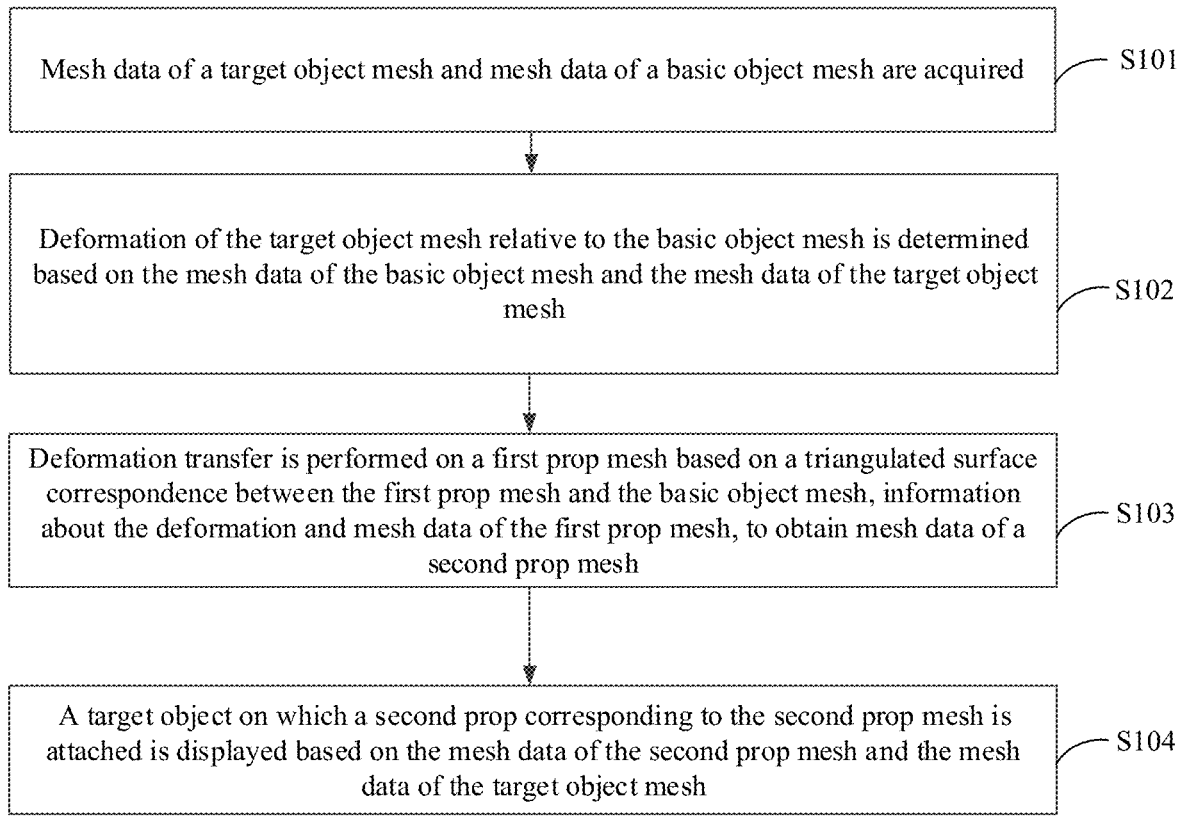
FIG. 1 is a flowchart of a prop attachment method according to an embodiment of the present disclosure.

Based on this, a prop attachment method is provided according to an embodiment of the present disclosure. Reference is made to FIG. 1 which is a flowchart of a prop attachment method according to an embodiment of the present disclosure. The method includes the following steps S101 to S104.

In S101, mesh data of a target object mesh and mesh data of a basic object mesh are acquired.

In an embodiment of the present disclosure, a basic object is a standard object, and a target object may be an object generated based on a target user. The basic object and the target object may have a same or similar feature. For example, the basic object may be a basic face, while the target object may be a face of the target user. Of course, the basic object and the target object may be other body parts, or other types of objects, which is not limited in the embodiment of the present disclosure.

The target object mesh refers to a three-dimensional mesh (also known as a 3D mesh) of the target object. Similarly, the basic object mesh refers to a 3D mesh of the basic object.

In an embodiment of the present disclosure, the mesh data may include triangulated surface indexes and vertex data. A point located on the 3D mesh is called a vertex. A triangle formed by three adjacent vertices on the 3D mesh is called a triangulated surface. Each vertex on the 3D mesh has an index. Indices of three vertices forming a triangulated surface are used to form a triangulated surface index corresponding to the triangulated surface. The vertex data includes a correspondence between a vertex index and vertex coordinates.

In S102, deformation of the target object mesh relative to the basic object mesh is determined based on the mesh data of the basic object mesh and the mesh data of the target object mesh.

In an embodiment of the present disclosure, deformation of the target object mesh relative to the basic object mesh may be determined after the mesh data of the target object mesh and the mesh data of the basic object mesh are acquired.

In practice, differences between vertex coordinates of same indexed triangulated surfaces in the mesh data of the target object mesh and the mesh data of the basic object mesh can be determined as information about the deformation of the target object mesh relative to the basic object mesh. In an embodiment, information about the deformation is used to indicate how the vertex coordinates of each triangulated surface in the basic object mesh transform to the vertex coordinates of same indexed triangulated surface in the target object mesh.

In S103, deformation transfer is performed on a first prop mesh based on a triangulated surface correspondence between the first prop mesh and the basic object mesh, information about the deformation and mesh data of the first prop mesh, to obtain mesh data of a second prop mesh, where the first prop mesh is attached to the basic object mesh.

In an embodiment of the present disclosure, the first prop mesh is attached to the basic object mesh, and the triangulated surface correspondence between the first prop mesh and the basic object mesh may be obtained based on the mesh data of the first prop mesh and the mesh data of the basic object mesh. The triangulated surface correspondence refers to a correspondence between triangulated surfaces with the same index, and is used to represent differences between vertex coordinates of the triangulated surfaces with the same index.

In practice, the triangulated surface correspondence between the first prop mesh and the basic object mesh may be represented by the differences between vertex coordinates of triangulated surfaces with the same index in the first prop mesh and the basic object mesh. The deformation of the target object mesh relative to the basic object mesh may be represented by the differences between vertex coordinates of triangulated surfaces with the same index in the target object mesh and the basic object mesh. Then, differences between vertex coordinates of triangulated surfaces with the same index in the first prop mesh and a second prop mesh that can be attached to the target object mesh may be calculated based on the differences between vertex coordinates of the triangulated surfaces with the same index in the first prop mesh and the basic object mesh, and the differences between vertex coordinates of the triangulated surfaces with the same index in the target object mesh and the basic object mesh. The differences between vertex coordinates of the triangulated surfaces with the same index in the first prop mesh and the second prop mesh that can be attached to the target object mesh may indicate how vertex coordinates of each triangulated surface in the basic object mesh transform to vertex coordinates of the triangulated surface with the same index in the target object mesh. Thus, deformation transfer may be performed on the first prop network based on the differences between vertex coordinates of the triangulated surfaces with the same index in the first prop mesh and the second prop mesh that may be attached to the target object mesh. Mesh data of the first prop network after the deformation transfer is acquired and determined as mesh data of the second prop mesh.

In S104, a target object, on which a second prop corresponding to the second prop mesh is attached, is displayed based on the mesh data of the second prop mesh and the mesh data of the target object mesh, where the target object corresponds to the target object mesh.

After the mesh data of the second prop mesh is determined, a second prop corresponding to the second prop mesh and a target object corresponding to the target object mesh are respectively rendered based on the mesh data of the second prop mesh and the mesh data of the target object mesh, to obtain the target object attached with the second prop corresponding to the second prop network. The second prop and the target object attached with the second prop are displayed. For example, in an embodiment, the second prop and the target object may be displayed on an interface to show the user a display effect of attaching the second prop to the target object.

In a prop attachment method according to an embodiment of the present disclosure, first, deformation of a target object mesh relative to a basic object mesh, a triangulated surface correspondence between a first prop mesh and the basic object mesh, and mesh data of the first prop mesh are determined. Then, deformation transfer is performed on the first prop mesh based on information about the deformation, the triangulated surface correspondence and the mesh data of the first prop mesh to obtain mesh data of a second prop mesh. Finally, a target object attached with a second prop is displayed based on the mesh data of the second prop mesh and mesh data of the target object mesh. A function of prop attachment is realized.

According to an embodiment of the present disclosure, first, a first prop mesh attached to a basic object mesh is determined. Then, deformation transfer is performed on the first prop mesh based on a relationship between the first prop mesh and the basic object mesh and a relationship between the basic object mesh and a target object mesh to obtain a second prop mesh attached to the target object mesh. As seen, according to the embodiment of the present disclosure, prop attachment at fine granularity is realized and prop attachment effect is improved by performing deformation transfer on the prop mesh.

In an embodiment of the present disclosure, before the triangulated surface correspondence between the first prop mesh and the basic object mesh is determined, mesh data of the first prop mesh that can be attached to the basic object mesh is determined. In an embodiment, an initial prop mesh is deformed relative to the basic object mesh to obtain the mesh data of the first prop mesh.

Figure 2:
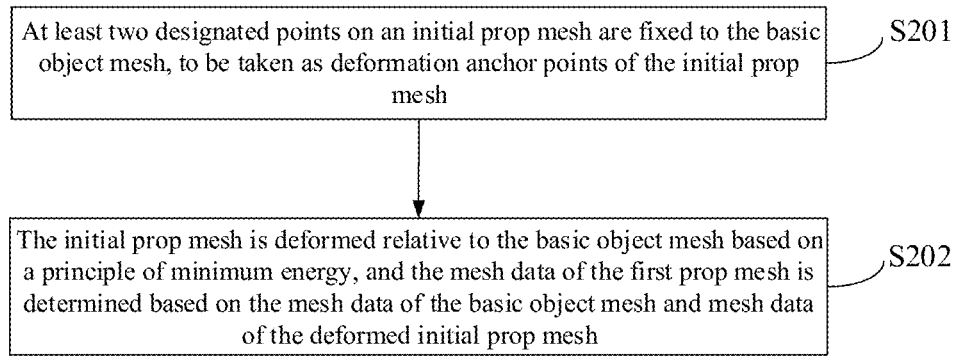
FIG. 2 is a flowchart of a method for determining mesh data of a first prop mesh according to an embodiment of the present disclosure.

Further, reference is made to FIG. 2 which is a flowchart of a method for determining mesh data of a first prop mesh according to an embodiment of the present disclosure. The method includes the following steps S201 to S202.

In S201, at least two designated points on an initial prop mesh are fixed to the basic object mesh, to be taken as deformation anchor points of the initial prop mesh.

In an embodiment of the present disclosure, the initial prop mesh is usually a 3D mesh corresponding to a native prop designed by a designer. Before the initial prop mesh is applied to a target object mesh, it is needed to deform the initial prop mesh into a first prop mesh that can be attached to the basic object mesh. Then, a second prop mesh that can be attached to the target object mesh may be obtained by performing deformation transfer on the first prop mesh, to realize the prop attachment function.

In an embodiment of the present disclosure, after the initial prop mesh is determined, at least two vertices on the initial prop mesh are determined as designated points, which are to be fixed to the basic object mesh in the deformation process of the initial prop mesh. Then, the designated points on the initial prop mesh are fixed to the basic object mesh to be taken as deformation anchor points of the initial prop mesh. The deformation anchor points are configured for being fixed on the initial object mesh in the deformation process of the initial prop mesh.

In an optional embodiment, in the world coordinate system, coordinates of points on the basic object mesh which are projected from the designated points in the initial prop mesh are calculated sequentially along a Z-axis direction, to be taken as the deformation anchor points of the initial prop mesh.

In an embodiment, it is assumed that one of the designated points on the initial prop mesh is a vertex P, and a formula representing that the point P is coplanar with a triangle ABC is $\alpha A+\beta B+\gamma Z=P$. First, a Z-axis coordinate of the point P is fixed. Then, for each triangulated surface on the basic object mesh, it is determined whether the point P is located in the triangulated surface, that is, whether $\alpha+\beta+\gamma=1$ is satisfied. After a triangulated surface in which the point P is located is found, X-axis and Y-axis coordinates of the point P are fixed, its Z-axis coordinate z' is calculated to satisfy a formula of $\alpha A+\beta B+\gamma Z=P'$ in three-dimensional space, and finally a projection of the designated point on the initial prop mesh to the basic object mesh is completed.

In practice, it is assumed that the basic object mesh is a mesh of a basic face, then a designated point on the initial prop mesh is usually a point on a fitting surface of the basic face. The designated point may be designated by default or based on a user input, which is not limited here.

In an optional embodiment, a movement of a deformation anchor point on the initial prop mesh to a vertex at a corresponding position on the first prop mesh may be expressed by using the following formula (1):

$$v'_i = C_i (i \in C) \tag{1}$$

$v'_i$ is a vertex of the first prop mesh which corresponds to an i-th deformation anchor point of the initial prop mesh, C is a deformation anchor point of the initial prop mesh, and $C_i$ is the i-th deformation anchor point.

In S202, the initial prop mesh is deformed relative to the basic object mesh based on a principle of minimum energy, and the mesh data of the first prop mesh is determined based on the mesh data of the basic object mesh and mesh data of the deformed initial prop mesh.

The deformation of the initial prop network relative to the basic object mesh is realized based on the principle of minimum energy to ensure a minimum change in the deformation of the initial prop network relative to the basic object network.

Figure 3:
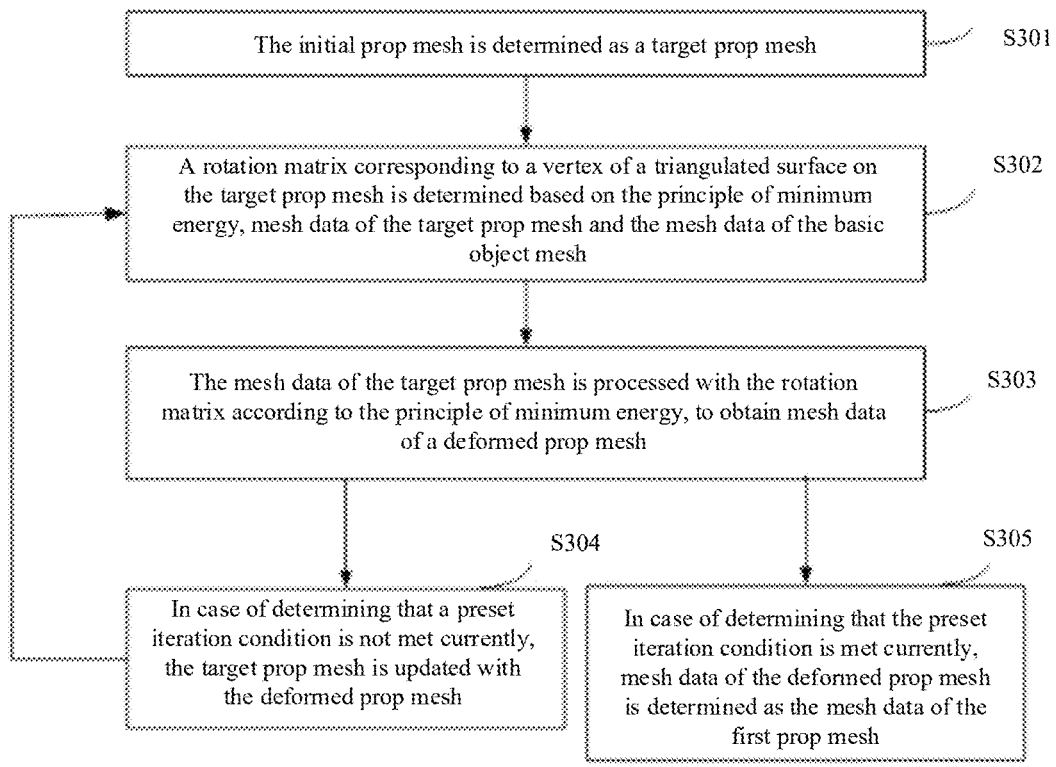
FIG. 3 is a flowchart of a method for mesh data of a first prop mesh according to an embodiment of the present disclosure.

The mesh data of the first prop mesh is determined based on the mesh data of the basic object mesh and mesh data of the deformed initial prop mesh. The initial prop corresponding to the initial prop mesh deforms into a first prop corresponding to the first prop mesh. In an embodiment of the present disclosure, the mesh data of the first prop mesh is further determined after vertexes on the first prop mesh corresponding to the deformation anchor points on the initial prop mesh are determined. Reference is made to FIG. 3 which is a flowchart of a method for mesh data of a first prop mesh according to an embodiment of the present disclosure. The method includes the following steps S301 to S305.

In S301, the initial prop mesh is determined as a target prop mesh.

In S302, a rotation matrix corresponding to a vertex of a triangulated surface on the target prop mesh is determined based on the principle of minimum energy, mesh data of the target prop mesh and the mesh data of the basic object mesh.

In an embodiment of the present disclosure, the rotation matrix corresponding to the vertex of the triangulated surface on the target prop mesh is determined based on the principle of minimum energy, to ensure that an edge formed by the vertex of the triangulated surface and its adjacent point changes minimally in the deformation process of the target prop mesh.

In an optional embodiment, the rotation matrix corresponding to the vertex of the triangulated surface on the target prop mesh may be calculated based on the principle of minimum energy by using the following formula (2):

$$E(C_i, C_i') = \sum_{j \in N(i)} w_{ij} \|(p_i' - p_j') - R_i(p_i - p_j)\|^2 \quad (2)$$

Point j belongs to an adjacent point set N(i) of point i, p represents a vertex of the initial prop mesh, p' represents a vertex corresponding to p on the first prop mesh in a current iteration state, and $W_{ij}$ represents a weight coefficient for an edge formed by point i and point j.

A condition for minimizing energy E ($C_i$, $C_i'$) in the formula (2) may be expressed as the following two formulas, i.e., formula (3) and formula (4):

$$R_i = V_i U_i^T \quad (3)$$

$$S_i = \sum_{j \in N(i)} w_{ij} e_{ij} e_{ij}'^T = P_i D_i P_i'^T \quad (4)$$

where $e_{ij}$ represents an edge formed by vertex i and adjacent point j on the initial prop mesh, i.e., $p_j$-$p_i$. Accordingly, $e'_{ij}$ represents an edge on the first prop mesh corresponding to $e_{ij}$ in a current iteration state, $W_{ij}$ represents a weight coefficient for the edge $e_{ij}$, and point j belongs to an adjacent point set N(i) of point i.

Formula (4) may be simplified as a product of three matrices. $P_i$ is a matrix of a size 3×N(i) composed of all adjacent edges of point i. Accordingly, $P_i'$ is a matrix composed of all adjacent edges of point i in a current iteration state. $D_i$ is a diagonal matrix, whose diagonal elements are weights for all adjacent edges of point i. Thus, a rotation matrix $R_i$ of point i is a product of two unitary matrices $U_i$ and $V_i$ obtained by singular value decomposition of $S_i$ matrix, as shown in formula (3).

In S303, the mesh data of the target prop mesh is processed with the rotation matrix according to the principle of minimum energy, to obtain mesh data of a deformed prop mesh.

In an embodiment of the present disclosure, after the rotation matrix $R_i$ corresponding to the vertex of the triangulated surface on the target prop mesh is determined, mesh data of a deformed prop mesh, which is obtained by performing deformation on the target prop mesh based on the rotation matrix $R_i$, is calculated.

In an embodiment of the present disclosure, obtaining the deformed prop mesh by performing deformation on the target prop mesh based on the rotation matrix is also realized based on the principle of minimum energy. In an embodiment, deformation energy in the deformation process may be expressed by using the following formula (5):

$$E(S') = \sum_{i=1}^{n} w_i E(C_i, C_i') = \sum_{i=1}^{n} w_i \sum_{j \in N(i)} w_{ij} \|(p_i' - p_j') - R_i(p_i - p_j)\|^2 \quad (5)$$

Each parameter in formula (5) may be understood with reference to formulas (2) to (4), which is not repeated here.

In an embodiment of the present disclosure, the formula (6) which holds when the deformation energy is minimized may be obtained by taking the derivative of the deformation energy formula (5):

$$\sum_{j \in N(i)} w_{ij}(p_i' - p_j') = \sum_{j \in N(i)} \frac{w_{ij}}{2}(R_i + R_j)(p_i - p_j) \quad (6)$$

Thus, the problem of solving a vertex coordinate on the deformed prop mesh may be transformed into a problem of solving sparse non-homogeneous linear equations, that is Lp'=b, which is not detailed herein.

In S304, in case of determining that a preset iteration condition is not met currently, the target prop mesh is updated with the deformed prop mesh, and S302 and subsequent steps are performed.

In S305, in case of determining that the preset iteration condition is met currently, mesh data of the deformed prop mesh is determined as the mesh data of the first prop mesh.

In an embodiment of the present disclosure, the preset iteration condition may include reaching a preset iteration number, and/or, the deformation energy being lower than a preset threshold.

In practice, in each round of iteration, if it is determined that the preset iteration number is reached at this round, or the deformation energy of the mesh is lower than the preset threshold, the deformation iteration of the target prop mesh may be ended, and the deformed prop mesh obtained in this round is determined as the first prop mesh, to obtain the mesh data of the first prop mesh. Otherwise, S302 and subsequent steps are performed to continue the next round of deformation iteration on the deformed prop mesh.

Based on the mesh data of the first prop mesh obtained in the above embodiment, the triangulated surface correspondence between the first prop mesh and the basic object mesh is further determined according to an embodiment of the present disclosure. In an embodiment, the triangulated surface correspondence between the first prop mesh and the basic object mesh is determined based on the principle of minimum energy, the mesh data of the first prop mesh and the mesh data of the basic object mesh.

In practice, the first prop mesh is deformed into the basic object mesh based on the principle of minimum energy, so that the triangulated surface correspondence between the first prop mesh and the basic object mesh is obtained. The triangulated surface correspondence may be expressed as a set M of triangulated surfaces:

$$M = \{(s_1, t_1), (s_2, t_2), \ldots, (s_{|M|}, t_{|M|})\}$$

where $s_i$ represents a triangulated surface indexed i in the basic object mesh, $t_i$ represents a triangulated surface indexed i in the first prop mesh, and |M| represents the number of triangulated surfaces with the correspondence.

In addition, the definition of deformation energy in the principle of minimum energy includes the following formula:

$$E = w_S E_S + w_I E_I + w_C E_C + E_R$$

$$\text{s.t. } x_{m_k} = m_k, k \in 1 \ldots m \quad (7)$$

The first aspect is the control of deformation smoothness, which is used to apply the constrain in the deformation of the first prop mesh that adjacent triangulated surfaces have equal transformations, as shown in the following formula (8):

$$E_S(v_1 \ldots v_n) = \sum_{i=1}^{|T|} \sum_{j \in adj(i)} \|T_i - T_j\|_F^2 \quad (8)$$

|T| represents the number of triangulated surfaces in the first prop mesh, $T_i$ represents a transformation of a triangulated surface with index i, $T_j$ is similar, and adj(i) represents a vertex set adjacent to vertex i. Each parameter in the formula (8) may be calculated as follows, where $v_4$ is a point defined in a normal direction of the triangulated surface.

$$T = \tilde{V} V^{-1} \quad (9)$$

$$V = [v_2 - v_1, v_3 - v_1, v_4 - v_1]$$

$$\tilde{V} = [\tilde{v}_2 - \tilde{v}_1, \tilde{v}_3 - \tilde{v}_1, \tilde{v}_4 - \tilde{v}_1] \quad (10)$$

$$v_4 = v_1 + (v_2 - v_1) \times (v_3 - v_1) / \sqrt{|(v_2 - v_1) \times (v_3 - v_1)|} \quad (11)$$

$v_1$, $v_2$, and $v_3$ represent three vertices forming a same triangulated surface. Point $v_4$, which is at a unit distance from point $v_1$ along a normal forward direction of the triangulated surface, represents a transformation of the triangulated surface in a vertical direction. $\tilde{v}_1$, $\tilde{v}_2$, and $\tilde{v}_3$ represents the deformed $v_1$, $v_2$, and $v_3$, respectively.

The second aspect is the constraint of conformal, which is used to prevent the first prop mesh from being deformed excessively in order to satisfy the deformation smoothness of a certain vertex i, as shown in the following formula:

$$E_I(v_1 \ldots v_n) = \sum_{i=1}^{|T|} \|T_i - I\|_F^2 \quad (12)$$

I represents a unit matrix, $T_i$ represents a transformation of a triangulated surface with index i, and |T| represents the number of triangulated surfaces in the first prop mesh.

The third aspect is the control of nearest available neighbor point. An available vertex refer to a vertex that is at an angle less than 90 degrees with a normal direction of the triangulated surface. The third aspect is used to make the vertex of the first prop mesh close to a nearest available neighbor vertex on the basic object mesh, as shown in the following formula:

$$E_C(v_1 \ldots v_n, c_1 \ldots c_n) = \sum_{i=1}^{n} \|v_i - c_i\|^2 \quad (13)$$

$C_i$ represents a nearest available neighbor vertex on the first prop mesh for an i-th vertex $v_i$ on the basic object mesh.

The fourth aspect is the control of component association item, which is used to keep a relative relationship between components before and after deformation in a case that the first prop mesh is composed of multiple components, so that components without user intervention may be deformed normally, as shown in the following formula:

$$E_R = \sum_{a,b} \sum_{(t_i^a, t_j^b)} \left( w_S \left\| \hat{F}_{t_i^a} - \hat{F}_{t_j^b} \right\|^2 + w_I \left\| \hat{F}_{t_i^a} - I \right\|^2 + w_I \left\| \hat{F}_{t_j^b} - I \right\|^2 \right) \quad (14)$$

$F_{ti}$ represents a transformation of a triangulated surface with index i in the first prop mesh, $(t_i^a, t_j^b)$ represents an adjacent triangulated surface pair of a point pair $(v_i^a, v_j^b)$ in a point pair set Pab corresponding to components a and b in the first prop mesh, and $(t_i^a, t_j^b)$ satisfies the following formula:

$$\operatorname*{argmax}_{t_i^a, t_j^b} |h \cdot n_{t_i^a}| + |h \cdot n_{t_j^b}| \quad (15)$$

$n_t$ is a normal vector of a triangulated surface t, and h is a vector connecting centroids of triangulated surfaces $t_i^a$ and $t_j^b$.

In addition to the energy item constraints of the above four aspects, the deformation further includes mandatory constraint defined by the user. That is, the selected vertex Xmk on the first prop mesh is forced to be equal to the vertex mk on the basic object mesh, where k is an index of a user-selected point set.

Based on the control of component association item in the fourth aspect, according to an embodiment of the present disclosure, a method for determining a relative relationship between adjacent components among multiple components is further provided, so that the deformation transfer may be performed on the first prop mesh based on the triangulated surface correspondence between the first prop mesh and the basic object mesh, the deformation of the target object mesh relative to the basic object mesh and the relative relationship between adjacent components among multiple components, to ensure that the relative relationship between the adjacent components remains unchanged.

In an embodiment, in a case that the first prop mesh includes multiple components, according to an embodiment of the present disclosure, the performing deformation transfer on the first prop mesh based on a triangulated surface correspondence between the first prop mesh and the basic object mesh, and information about the deformation to obtain mesh data of a second prop mesh includes:

performing the deformation transfer on the first prop mesh based on the triangulated surface correspondence between the first prop mesh and the basic object mesh, information about the deformation and a relative relationship between adjacent components among the multiple components, to obtain the mesh data of the second prop mesh.

In an embodiment of the present disclosure, if it is determined that the first prop mesh has multiple components, a shortest vertex distance do between any pair of components a and b is calculated firstly, which may be expressed by the following formula (16):

$$d_{a,b} := \|v_i^a - v_j^b\| = \min_{v_i \in T_a, v_j \in T_b} \|v_i - v_j\| \quad (16)$$

Then, with each component as a vertex and the shortest vertex distance between components as a weight for an edge, a graph is constructed and its minimum spanning tree is established, which is recorded as k.

Furthermore, for each vertex in k, a maximum distance from the vertex to the remaining vertices in k is calculated and recorded as a maximum distance $d_a$ of the vertex, as shown in the following formula (17):

$$d_a = \max_{edge(a,b) \in K} d_{a,b} \quad (17)$$

where edge (a, b) represents an edge formed connecting vertices a and b.

For the vertex a, if in k there is a vertex b that is not yet connected with the vertex a satisfying the following formulas (18) and (19), the vertex a is connected with the vertex b in k.

$$d_{a,b} \leq d_a + \varepsilon_a \quad (18)$$

$$d_{a,b} \leq d_b + \varepsilon_b \quad (19)$$

$\varepsilon_a$ is a preset threshold, generally 1.5 times a maximum edge length in a component corresponding to point a, and $\varepsilon_b$ is similarly defined.

After a sub-graph k representing a relationship between components is established based on the above steps, a point pair set Pab is established for any components a and b. In a case that a and b are not connected with each other in k, the set Pab is empty; while in a case that a and b are connected with each other, a point pair $\{v^a_k, v^b_l\}$ satisfying the following formula (20) is put into the set Pab to obtain a relative relationship between adjacent components:

$$\|v_k^a - v_l^b\| < d_{a,b} + \min\{\varepsilon_a, \varepsilon_b\} \tag{20}$$

After the relative relationship between adjacent components among multiple components is obtained, the first prop mesh is deformed based on the triangulated surface correspondence between the first prop mesh and the basic object mesh, information about the deformation and the relative relationship between adjacent components among the multiple components, to obtain the mesh data of the second prop mesh.

In another embodiment, after determining the triangulated surface relationship between the first prop mesh and the basic object mesh together with information about the deformation of the target object mesh relative to the basic object mesh in above-described manner, the deformation transfer is performed on the first prop mesh according to the principle of minimum energy, based on the triangulated surface correspondence between the first prop mesh and the basic object mesh, information about the deformation and the mesh data of the first prop mesh, to obtain the mesh data of the second prop mesh.

First, in a process of performing deformation transfer on the first prop mesh based on the principle of minimum energy to obtain the second prop mesh, the definition of deformation energy also includes four parts:

$$E = w_1 E_1 + w_2 E_2 + w_3 E_3 + w_4 E_4 \tag{21}$$

$w_1$ to $w_4$ are weight coefficients in $E_1$ to $E_4$, respectively.

A first item $E_1$ is used to measure a difference between the deformation of the target object mesh relative to the basic object mesh and the deformation of the first prop mesh relative to the basic object mesh. Obviously, in a case that the difference is smaller, deformation of the first prop mesh relative to the basic object mesh is more similar to the deformation of the target object mesh relative to the basic object mesh. In an embodiment, $E_1$ is expressed by using the following formula (22):

$$E_1 = \sum_{i=1}^{|M|} \|F_{s_i} - F_{t_i}\|^2 \tag{22}$$

M is a set of triangulated surfaces determined in the above embodiment to represent the triangulated surface correspondence between the first prop mesh and the basic object mesh, and F is a transformation of a corresponding triangulated surface in M.

In addition, a second item $E_2$ is used to represent triangulated surfaces in the first prop mesh that do not form a correspondence with triangulated surfaces in the basic object mesh. This constraint makes a transformation of these triangulated surfaces converge with that of adjacent triangulated surfaces, as shown in the following formula:

$$E_2 = \sum_{t_i \in H} \sum_{t_j \in N(t_i)} \|F_{t_i} - F_{t_j}\|^2 \tag{23}$$

H represents a set of triangulated surfaces in the first prop mesh that do not form a correspondence with triangulated surfaces in the basic object mesh.

In addition, a third item $E_3$ is used to maintain a spatial relationship among the components in the first prop mesh, which is specifically realized by restricting a length change of each point pair in the set Pab obtained in the above embodiment before and after the deformation, as shown in the following formula (24):

$$E_3 = \sum_{\substack{T_a, T_b \in T \\ a \neq b}} \sum_{(v_i^a, v_j^b) \in P_{a,b}} (\|\tilde{v}_i^a - \tilde{v}_j^b\| - \|v_i^a - v_j^b\|)^2 \tag{24}$$

In addition, a fourth item $E_4$ is used to protect a surface detail of the components completely composed of triangulated surfaces in H, as shown in the following formula:

$$E_4 = \sum_{T_a \in T_H} \|L_{T_a} \tilde{V}_{T_a} - \hat{\delta}(\tilde{V}_{T_a})\|^2 \tag{25}$$

$T_H$ represents a set of triangulated surfaces with no correspondence, $T_a$ represents a triangulated surface in $T_H$, L represents a Laplace Operator, $L_{T_a}$ represents a Laplace Operator on the triangulated surface $T_a$, and $\delta$ represents a Laplace coordinate calculated as follows:

$$\hat{\delta}(\tilde{V}_{T_a}) = \frac{L_{T_a} \tilde{V}_{T_a}}{\|L_{T_a} \tilde{V}_{T_a}\|} \|L_{T_a} V_{T_a}\| \tag{26}$$

It is noted that the definitions of the same parameters in the above formulas (1) to (26) can be referred to each other.

Figure 4:
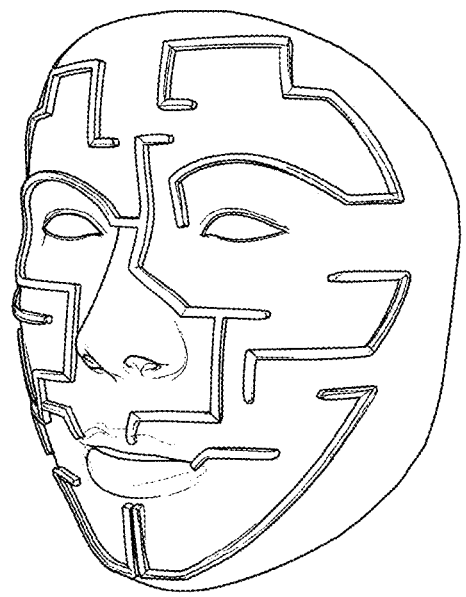
FIG. 4 is an effect diagram of a second prop attached to a face of a target user according to an embodiment of the present disclosure.

In practical application scenario, according to an embodiment of the present disclosure, the target object mesh may be a mesh for a face of a target user, and the basic object mesh may be a basic face mesh. A second prop mesh that can be attached to the mesh for the face of the target user is obtained by performing deformation transfer on a first prop mesh attached to the basic face mesh. FIG. 4 is an effect diagram of a second prop attached to the face of the target user according to an embodiment of the present disclosure.

According to an embodiment of the present disclosure, deformation transfer is performed on a first prop mesh based on information about the deformation information of the target user face mesh relative to a basic face mesh, a triangulated surface correspondence between the first prop mesh and the basic face mesh, and mesh data of the first prop mesh attached to the basic face mesh, so as to obtain a second prop mesh attached to a target user face mesh, thus realizing prop attachment at fine granularity, improving prop attachment effect, and enhancing the user experience.

Figure 5:
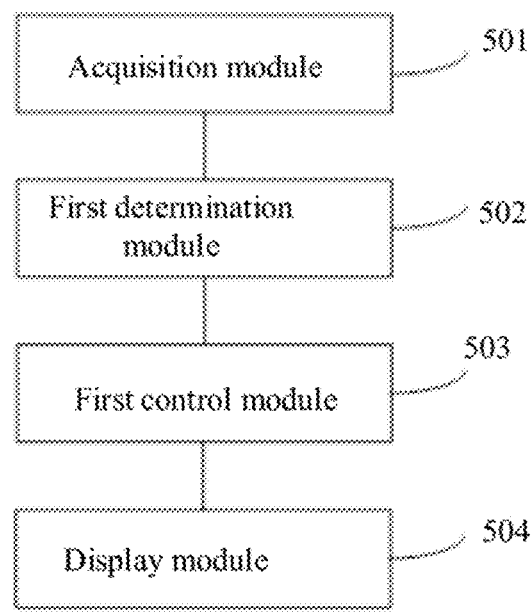
FIG. 5 is a schematic structural diagram of a prop attachment apparatus according to an embodiment of the present disclosure.

Based on the same inventive concept as the above method embodiments, a prop attachment apparatus is further provided according to the present disclosure. Reference is made to FIG. 5 which is a schematic structural diagram of a prop attachment apparatus according to an embodiment of the present disclosure. The apparatus includes an acquisition module 501, a first determination module 502, a first control module 503 and a display module 504.

The acquisition module 501 is configured to acquire mesh data of a target object mesh and mesh data of a basic object mesh.

The first determination module 502 is configured to determine deformation of the target object mesh relative to the basic object mesh based on the mesh data of the basic object mesh and the mesh data of the target object mesh.

The first control module 503 is configured to perform deformation transfer on a first prop mesh based on a triangulated surface correspondence between the first prop mesh and the basic object mesh, information about the deformation and mesh data of the first prop mesh to obtain mesh data of a second prop mesh, where the first prop mesh is attached to the basic object mesh.

The display module 504 is configured to display, based on the mesh data of the second prop mesh and the mesh data of the target object mesh, a target object on which a second prop corresponding to the second prop mesh is attached, where the target object corresponds to the target object mesh.

In an optional embodiment, the apparatus further includes a second control module and a second determination module.

The second control module is configured to deform an initial prop mesh relative to the basic object mesh to obtain the mesh data of the first prop mesh.

The second determination module is configured to determine the triangulated surface correspondence between the first prop mesh and the basic object mesh based on a principle of minimum energy, the mesh data of the first prop mesh and the mesh data of the basic object mesh.

In an optional embodiment, the second control module includes a fixing sub-module and a first determination sub-module.

The fixing sub-module is configured to fix at least two designated points on the initial prop mesh on the basic object mesh, as deformation anchor points of the initial prop mesh, where the deformation anchor points are configured for being fixed on the initial prop mesh in a deformation process of the initial prop mesh.

The first determination sub-module is configured to deform the initial prop mesh relative to the basic object mesh based on the principle of minimum energy, and determine the mesh data of the first prop mesh based on the mesh data of the basic object mesh and mesh data of the deformed initial prop mesh, where an initial prop corresponding to the initial prop mesh deforms into a first prop corresponding to the first prop mesh.

In an optional embodiment, the first determination sub-module includes a second determination sub-module, a third determination sub-module, a processing sub-module and a fourth determination sub-module.

The second determination sub-module is configured to determine the initial prop mesh as a target prop mesh.

The third determination sub-module is configured to determine a rotation matrix corresponding to a vertex of a triangulated surface on the target prop mesh based on the principle of minimum energy, mesh data of the target prop mesh and the mesh data of the basic object mesh.

The processing sub-module is configured to process the mesh data of the target prop mesh with the rotation matrix according to the principle of minimum energy, to obtain mesh data of a deformed prop mesh.

The fourth determination sub-module is configured to: in case of determining that a preset iteration condition is not met currently, update the target prop mesh based on the deformed prop mesh, and trigger the third determination sub-module, until it is determined that the preset iteration condition is met currently, then determine mesh data of the deformed prop mesh as the mesh data of the first prop mesh.

In an optional embodiment, the first prop mesh includes multiple components. The first control module is specifically configured to:

perform the deformation transfer on the first prop mesh based on the triangulated surface correspondence between the first prop mesh and the basic object mesh, information about the deformation and a relative relationship between adjacent components among the multiple components, to obtain the mesh data of the second prop mesh.

In an optional embodiment, the first control module is specifically configured to:

perform the deformation transfer on the first prop mesh according to the principle of minimum energy, based on the triangulated surface correspondence between the first prop mesh and the basic object mesh, information about the deformation and the mesh data of the first prop mesh, to obtain the mesh data of the second prop mesh.

In a prop attachment apparatus according to an embodiment of the present disclosure, first, mesh data of a target object mesh and mesh data of a basic object mesh are acquired. Then, deformation of the target object mesh relative to the basic object mesh is determined based on the mesh data of the basic object mesh and the mesh data of the target object mesh. Next, deformation transfer is performed on a first prop mesh based on a triangulated surface correspondence between the first prop mesh and the basic object mesh, information about the deformation and mesh data of the first prop mesh, to obtain mesh data of a second prop mesh, where the first prop mesh is attached to the basic object mesh. Finally, a target object, on which a second prop corresponding to the second prop mesh is attached, is displayed based on the mesh data of the second prop mesh and the mesh data of the target object mesh.

According to an embodiment of the present disclosure, deformation transfer is performed on a first prop mesh based on information about the deformation information of the target user face mesh relative to a basic face mesh, a triangulated surface correspondence between the first prop mesh and the basic face mesh, and mesh data of the first prop mesh attached to the basic face mesh, so as to obtain a second prop mesh attached to a target user face mesh, thus realizing prop attachment at fine granularity and improving prop attachment effect.

In addition to the above method and apparatus, a computer readable storage medium storing instructions is further provided according to an embodiment of the present disclosure. The instructions, when being executed on a terminal device, cause the terminal device to implement the prop attachment method according to the embodiment of the present disclosure.

Figure 6:
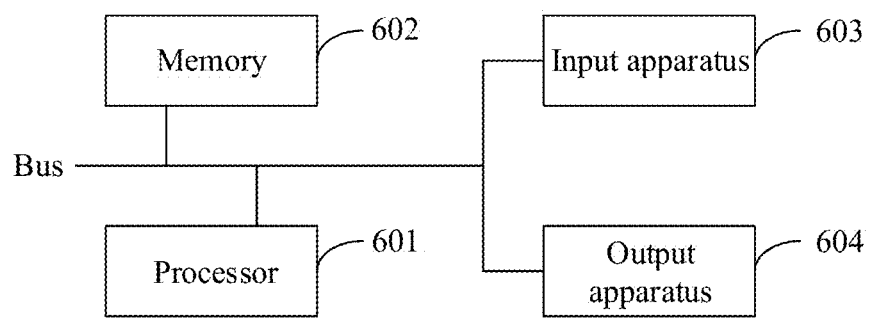
FIG. 6 is a schematic structural diagram of a prop attachment device according to an embodiment of the present disclosure.

In addition, a prop attachment device is further provided according to an embodiment of the present disclosure. As shown in FIG. 6, the device may include:

a processor 601, a memory 602, an input apparatus 603 and an output apparatus 604. There may be one or more processors 601 in the prop attachment device. One processor is taken as an example in FIG. 6. In some embodiments of the present disclosure, the processor 601, the memory 602, the input apparatus 603 and the output apparatus 604 may be connected through a bus or other manner. In FIG. 6, a connection through the bus is taken as an example.

The memory 602 may be configured to store a software program and module. The processor 501 executes the software program and module stored in the memory 602, to perform various functional applications and data processing of the prop attachment device. The memory 602 may mainly include a program memory area and a data memory area. An operating system, an application program required by at least one function and the like are stored in the program memory area. Moreover, the memory 602 may include a high-speed random access memory, and may further include a non-volatile memory, such as at least one disk storage device, a flash device or other volatile solid-state storage device. The input apparatus 603 may be configured to receive inputted number or character information, and generate a signal input related to user settings and function control of the prop attachment device.

In the embodiment, the processor 601 may load an executable file corresponding to the processes of one or more application programs into the memory 602 in response to an instruction, and the processor 601 executes the application program stored in the memory 602, thereby realizing various functions in the prop attachment device.

It should be noted that in the present disclosure, relational terms such as "first" and "second" are merely used to distinguish one entity or operation from another entity or operation, but do not indicate or imply an actual relationship or order of these entities or operations. In addition, terms of "include", "comprise" or any other variants are intended to be non-exclusive. Therefore, a process, method, article or device including multiple elements includes not only the elements but also other elements that are not enumerated, or also includes the elements inherent for the process, method, article or device. Unless expressively limited otherwise, an element defined by a statement of "including one . . . " does not exclude a case that other similar elements exist in the process, method, article or device including the element.

The above are only specific implementations of the present disclosure, so that those skilled in the art can understand or implement the present disclosure. Numerous modifications to the embodiments are apparent to those skilled in the art, and the general principles defined herein may be implemented in other embodiments without departing from the spirit or scope of the present disclosure. Therefore, the present disclosure is not limited to the embodiments illustrated herein, but should be defined by the broadest scope consistent with the principle and novel features disclosed herein.

The invention claimed is:

1. A prop attachment method, comprising:
acquiring mesh data of a target object mesh and mesh data of a basic object mesh;
determining deformation of the target object mesh relative to the basic object mesh based on the mesh data of the basic object mesh and the mesh data of the target object mesh;
performing deformation transfer on a first prop mesh based on a triangulated surface correspondence between the first prop mesh and the basic object mesh, information about the deformation and mesh data of the first prop mesh, to obtain mesh data of a second prop mesh, wherein the first prop mesh is attached to the basic object mesh; and
displaying, based on the mesh data of the second prop mesh and the mesh data of the target object mesh, a target object on which a second prop corresponding to the second prop mesh is attached, wherein the target object corresponds to the target object mesh.

2. The method according to claim 1, wherein before the performing deformation transfer on a first prop mesh relative to the target object mesh based on a triangulated surface correspondence between the first prop mesh and the basic object mesh, information about the deformation and mesh data of the first prop mesh, the method further comprises:
deforming an initial prop mesh relative to the basic object mesh, to obtain the mesh data of the first prop mesh; and
determining the triangulated surface correspondence between the first prop mesh and the basic object mesh based on a principle of minimum energy, the mesh data of the first prop mesh and the mesh data of the basic object mesh.

3. The method according to claim 2, wherein the deforming an initial prop mesh relative to the basic object mesh to obtain the mesh data of the first prop mesh comprises:
fixing at least two designated points on the initial prop mesh to the basic object mesh, as deformation anchor points of the initial prop mesh, wherein the deformation anchor points are configured for being fixed on the basic object mesh in a deformation process of the initial prop mesh; and
deforming the initial prop mesh relative to the basic object mesh based on the principle of minimum energy, and determining the mesh data of the first prop mesh based on the mesh data of the basic object mesh and mesh data of deformed initial prop mesh, wherein an initial prop corresponding to the initial prop mesh deforms into a first prop corresponding to the first prop mesh.

4. The method according to claim 3, wherein the deforming the initial prop mesh relative to the basic object mesh based on the principle of minimum energy, and determining the mesh data of the first prop mesh based on the mesh data of the basic object mesh and mesh data of the deformed initial prop mesh comprises:
determining the initial prop mesh as a target prop mesh;
determining a rotation matrix corresponding to a vertex of a triangulated surface on the target prop mesh, based on the principle of minimum energy, mesh data of the target prop mesh and the mesh data of the basic object mesh;
processing the mesh data of the target prop mesh with the rotation matrix according to the principle of minimum energy, to obtain mesh data of a deformed prop mesh; and
in case of determining that a preset iteration condition is not met currently, updating the target prop mesh based on the deformed prop mesh, and performing the step of determining a rotation matrix corresponding to a vertex of a triangulated surface on the target prop mesh based on the principle of minimum energy, mesh data of the target prop mesh and the mesh data of the basic object mesh and subsequent steps, until it is determined that the preset iteration condition is met currently, and then determining mesh data of the deformed prop mesh as the mesh data of the first prop mesh.

5. The method according to claim 2, wherein the first prop mesh comprises a plurality of components, and the performing deformation transfer on a first prop mesh based on a triangulated surface correspondence between the first prop mesh and the basic object mesh, and information about the deformation to obtain mesh data of a second prop mesh comprises:

performing the deformation transfer on the first prop mesh based on the triangulated surface correspondence between the first prop mesh and the basic object mesh, the information about the deformation and a relative relationship between adjacent components among the plurality of components, to obtain the mesh data of the second prop mesh.

6. The method according to claim 2, wherein the performing deformation transfer on a first prop mesh based on a triangulated surface correspondence between the first prop mesh and the basic object mesh, information about the deformation and mesh data of the first prop mesh to obtain mesh data of a second prop mesh comprises:

performing the deformation transfer on the first prop mesh according to the principle of minimum energy, based on the triangulated surface correspondence between the first prop mesh and the basic object mesh, the information about the deformation and the mesh data of the first prop mesh, to obtain the mesh data of the second prop mesh.

7. The method according to claim 1, wherein the first prop mesh comprises a plurality of components, and the performing deformation transfer on a first prop mesh based on a triangulated surface correspondence between the first prop mesh and the basic object mesh, and information about the deformation to obtain mesh data of a second prop mesh comprises:

performing the deformation transfer on the first prop mesh based on the triangulated surface correspondence between the first prop mesh and the basic object mesh, the information about the deformation and a relative relationship between adjacent components among the plurality of components, to obtain the mesh data of the second prop mesh.

8. The method according to claim 1, wherein the performing deformation transfer on a first prop mesh based on a triangulated surface correspondence between the first prop mesh and the basic object mesh, information about the deformation and mesh data of the first prop mesh to obtain mesh data of a second prop mesh comprises:

performing the deformation transfer on the first prop mesh according to the principle of minimum energy, based on the triangulated surface correspondence between the first prop mesh and the basic object mesh, the information about the deformation and the mesh data of the first prop mesh, to obtain the mesh data of the second prop mesh.

9. A non-transitory computer readable storage medium storing with instructions, wherein the instructions, when being executed on a terminal device, cause the terminal device to implement:

acquiring mesh data of a target object mesh and mesh data of a basic object mesh;

determining deformation of the target object mesh relative to the basic object mesh based on the mesh data of the basic object mesh and the mesh data of the target object mesh;

performing deformation transfer on a first prop mesh based on a triangulated surface correspondence between the first prop mesh and the basic object mesh, information about the deformation and mesh data of the first prop mesh, to obtain mesh data of a second prop mesh, wherein the first prop mesh is attached to the basic object mesh; and displaying, based on the mesh data of the second prop mesh and the mesh data of the target object mesh, a target object on which a second prop corresponding to the second prop mesh is attached, wherein the target object corresponds to the target object mesh.

10. The non-transitory computer readable storage medium according claim 9, wherein the instructions further cause the terminal device to implement:

deforming an initial prop mesh relative to the basic object mesh, to obtain the mesh data of the first prop mesh; and determining the triangulated surface correspondence between the first prop mesh and the basic object mesh based on a principle of minimum energy, the mesh data of the first prop mesh and the mesh data of the basic object mesh.

11. The non-transitory computer readable storage medium according claim 10, wherein the instructions further cause the terminal device to implement:

fixing at least two designated points on the initial prop mesh to the basic object mesh, as deformation anchor points of the initial prop mesh, wherein the deformation anchor points are configured for being fixed on the basic object mesh in a deformation process of the initial prop mesh; and deforming the initial prop mesh relative to the basic object mesh based on the principle of minimum energy, and determining the mesh data of the first prop mesh based on the mesh data of the basic object mesh and mesh data of deformed initial prop mesh, wherein an initial prop corresponding to the initial prop mesh deforms into a first prop corresponding to the first prop mesh.

12. The non-transitory computer readable storage medium according claim 11, wherein the instructions further cause the terminal device to implement:

determining the initial prop mesh as a target prop mesh;

determining a rotation matrix corresponding to a vertex of a triangulated surface on the target prop mesh, based on the principle of minimum energy, mesh data of the target prop mesh and the mesh data of the basic object mesh;

processing the mesh data of the target prop mesh with the rotation matrix according to the principle of minimum energy, to obtain mesh data of a deformed prop mesh; and in case of determining that a preset iteration condition is not met currently, updating the target prop mesh based on the deformed prop mesh, and performing the step of determining a rotation matrix corresponding to a vertex of a triangulated surface on the target prop mesh based on the principle of minimum energy, mesh data of the target prop mesh and the mesh data of the basic object mesh and subsequent steps, until it is determined that the preset iteration condition is met currently, and then determining mesh data of the deformed prop mesh as the mesh data of the first prop mesh.

13. The non-transitory computer readable storage medium according claim 9, wherein the instructions further cause the terminal device to implement:

performing the deformation transfer on the first prop mesh based on the triangulated surface correspondence between the first prop mesh and the basic object mesh, the information about the deformation and a relative relationship between adjacent components among the plurality of components, to obtain the mesh data of the second prop mesh.

14. The non-transitory computer readable storage medium according claim 9, wherein the instructions further cause the terminal device to implement:

performing the deformation transfer on the first prop mesh according to the principle of minimum energy, based on the triangulated surface correspondence between the first prop mesh and the basic object mesh, the information about the deformation and the mesh data of the first prop mesh, to obtain the mesh data of the second prop mesh.

15. A device, comprising a memory, a processor, and a computer program stored in the memory and executable on the processor, wherein the processor is configured to, when executing the computer program, implement the:
acquiring mesh data of a target object mesh and mesh data of a basic object mesh;
determining deformation of the target object mesh relative to the basic object mesh based on the mesh data of the basic object mesh and the mesh data of the target object mesh;
performing deformation transfer on a first prop mesh based on a triangulated surface correspondence between the first prop mesh and the basic object mesh, information about the deformation and mesh data of the first prop mesh, to obtain mesh data of a second prop mesh, wherein the first prop mesh is attached to the basic object mesh; and
displaying, based on the mesh data of the second prop mesh and the mesh data of the target object mesh, a target object on which a second prop corresponding to the second prop mesh is attached, wherein the target object corresponds to the target object mesh.

16. The device according claim 15, wherein the processor is further configured to, when executing the computer program, implement:
deforming an initial prop mesh relative to the basic object mesh, to obtain the mesh data of the first prop mesh; and
determining the triangulated surface correspondence between the first prop mesh and the basic object mesh based on a principle of minimum energy, the mesh data of the first prop mesh and the mesh data of the basic object mesh.

17. The device according claim 16, wherein the processor is further configured to, when executing the computer program, implement:
fixing at least two designated points on the initial prop mesh to the basic object mesh, as deformation anchor points of the initial prop mesh, wherein the deformation anchor points are configured for being fixed on the basic object mesh in a deformation process of the initial prop mesh; and
deforming the initial prop mesh relative to the basic object mesh based on the principle of minimum energy, and determining the mesh data of the first prop mesh based on the mesh data of the basic object mesh and mesh data of deformed initial prop mesh, wherein an initial prop corresponding to the initial prop mesh deforms into a first prop corresponding to the first prop mesh.

18. The device according claim 17, wherein the processor is further configured to, when executing the computer program, implement:
determining the initial prop mesh as a target prop mesh;
determining a rotation matrix corresponding to a vertex of a triangulated surface on the target prop mesh, based on the principle of minimum energy, mesh data of the target prop mesh and the mesh data of the basic object mesh;
processing the mesh data of the target prop mesh with the rotation matrix according to the principle of minimum energy, to obtain mesh data of a deformed prop mesh; and
in case of determining that a preset iteration condition is not met currently, updating the target prop mesh based on the deformed prop mesh, and performing the step of determining a rotation matrix corresponding to a vertex of a triangulated surface on the target prop mesh based on the principle of minimum energy, mesh data of the target prop mesh and the mesh data of the basic object mesh and subsequent steps, until it is determined that the preset iteration condition is met currently, and then determining mesh data of the deformed prop mesh as the mesh data of the first prop mesh.

19. The device according claim 15, wherein the first prop mesh comprises a plurality of components, and the processor is further configured to, when executing the computer program, implement:
performing the deformation transfer on the first prop mesh based on the triangulated surface correspondence between the first prop mesh and the basic object mesh, the information about the deformation and a relative relationship between adjacent components among the plurality of components, to obtain the mesh data of the second prop mesh.

20. The device according claim 15, wherein the processor is further configured to, when executing the computer program, implement:
performing the deformation transfer on the first prop mesh according to the principle of minimum energy, based on the triangulated surface correspondence between the first prop mesh and the basic object mesh, the information about the deformation and the mesh data of the first prop mesh, to obtain the mesh data of the second prop mesh.

* * * * *